(12) United States Patent
Makino et al.

(10) Patent No.: US 7,063,303 B2
(45) Date of Patent: Jun. 20, 2006

(54) THROTTLE APPARATUS HAVING AXIAL DISPLACEMENT RESTRICTING STRUCTURE

(75) Inventors: Isao Makino, Chiryu (JP); Tsuyoshi Arai, Kariya (JP); Naoki Hiraiwa, Toyokawa (JP); Hiroki Shimada, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/929,451

(22) Filed: Aug. 31, 2004

(65) Prior Publication Data

US 2005/0062008 A1   Mar. 24, 2005

(30) Foreign Application Priority Data

Sep. 19, 2003   (JP)   ............................. 2003-327093

(51) Int. Cl.
*F16K 31/44*   (2006.01)
(52) U.S. Cl. .................... 251/214; 251/308; 123/337
(58) Field of Classification Search .............. 251/214, 251/306, 308; 123/337; 384/275, 297, 299
See application file for complete search history.

(56) References Cited

U.S. PATENT DOCUMENTS

| 3,253,815 A | * | 5/1966 | Stiliwagon | .................. 251/148 |
| 5,370,148 A | * | 12/1994 | Shafer | ..................... 137/15.25 |
| 5,482,252 A | * | 1/1996 | Kamezawa | ................. 251/306 |
| 5,967,116 A | * | 10/1999 | Kawashima et al. | ........ 123/337 |

FOREIGN PATENT DOCUMENTS

JP   A-11-294203   10/1999

* cited by examiner

*Primary Examiner*—Edward K. Look
*Assistant Examiner*—John K. Fristoe, Jr.
(74) *Attorney, Agent, or Firm*—Nixon & Vanderhye P.C.

(57) ABSTRACT

A throttle shaft, first and second bearings, are inserted and formed in a bore wall part of a throttle body, when the throttle body is formed in the same dies. That is, when the throttle body is formed in a predetermined shape, the throttle shaft, the first and second bearings, are received in the bore wall part of the throttle body. First and second step portions, are formed in the throttle shaft, and axially inserted by first and second supporting portions, respectively formed in the first and second bearings, from both axially ends of the throttle shaft. Therefore, the throttle shaft can be restricted from moving axially, without additional thrust restricting means, such as an E-ring and a C-ring.

3 Claims, 8 Drawing Sheets

THROTTLE APPARATUS HAVING AXIAL DISPLACEMENT RESTRICTING STRUCTURE

CROSS REFERENCE TO RELATED APPLICATION

This application is based on and incorporates herein by reference Japanese Patent Application No. 2003-327093 filed on Sep. 19, 2003.

FIELD OF THE INVENTION

The present invention relates to a throttle apparatus that controls a flow amount of intake air introduced into an internal combustion engine through an intake air passage. Specifically, the throttle apparatus has a resinous throttle body including a cylindrical bore wall part, which internally forms the intake air passage, and bearings that are supported by bearing supporting portions (boss portions) formed in the bore wall part. The bearings and the bearing supporting portions are respectively arranged in the circumferential periphery of the cylindrical bore wall part to radially oppose to each other.

BACKGROUND OF THE INVENTION

According to JP-A-11-294203, a throttle body receiving a disc-shaped throttle valve and a substantially round bar shaped throttle shaft is integrally molded of a resinous material, so that weight of the product and production cost are reduced. The throttle body includes a cylindrical bore wall part that internally forms an intake air passage. The throttle valve opens and closes the intake air passage. The throttle valve is supported by a valve holding portion formed in the throttle shaft. The bore wall part of the throttle body has a first and second boss portions (bearing supporting portions) that are formed in the circumferential periphery of the bore wall part. Cylindrical bearings are assembled into the first and second boss portions of the bore wall part to rotatably support the throttle shaft. In this throttle apparatus, the throttle shaft is rotatably supported by first and second sliding holes respectively formed in the first and second bearings, so that the throttle shaft is restricted from moving circumferentially. However, the throttle shaft is not restricted from moving axially in its thrust direction.

In general, an angular sensor is provided in the throttle apparatus to detect a rotation angle of the throttle valve, i.e., throttle position. The angular sensor is constructed with a detecting element, such as a hall element and a magnet that is arranged to oppose to the detecting element. The magnet is provided on one axial end side of the throttle shaft. Therefore, when the throttle shaft moves in its thrust direction, accuracy of detection of the throttle position may be degraded. Accordingly, the throttle shaft needs to be properly positioned in the thrust direction.

Besides, when the throttle shaft is largely displaced in its thrust direction, the inner wall face of the bore wall part and the outer circumferential periphery of the throttle valve may interfere with each other when the throttle valve is in the vicinity of its full close position. Accordingly, scratch and chipping may be caused. Besides, the throttle valve and the throttle shaft may not be smoothly operated, and throttle position may not be promptly controlled corresponding to an accelerator position operated by the driver. As a result, drivability of the vehicle may be impaired. When airtightness of the throttle valve in its full close position is degraded, idling speed of the engine increases, and fuel efficiency may be impaired in an idling operation of the vehicle.

Figure 7:
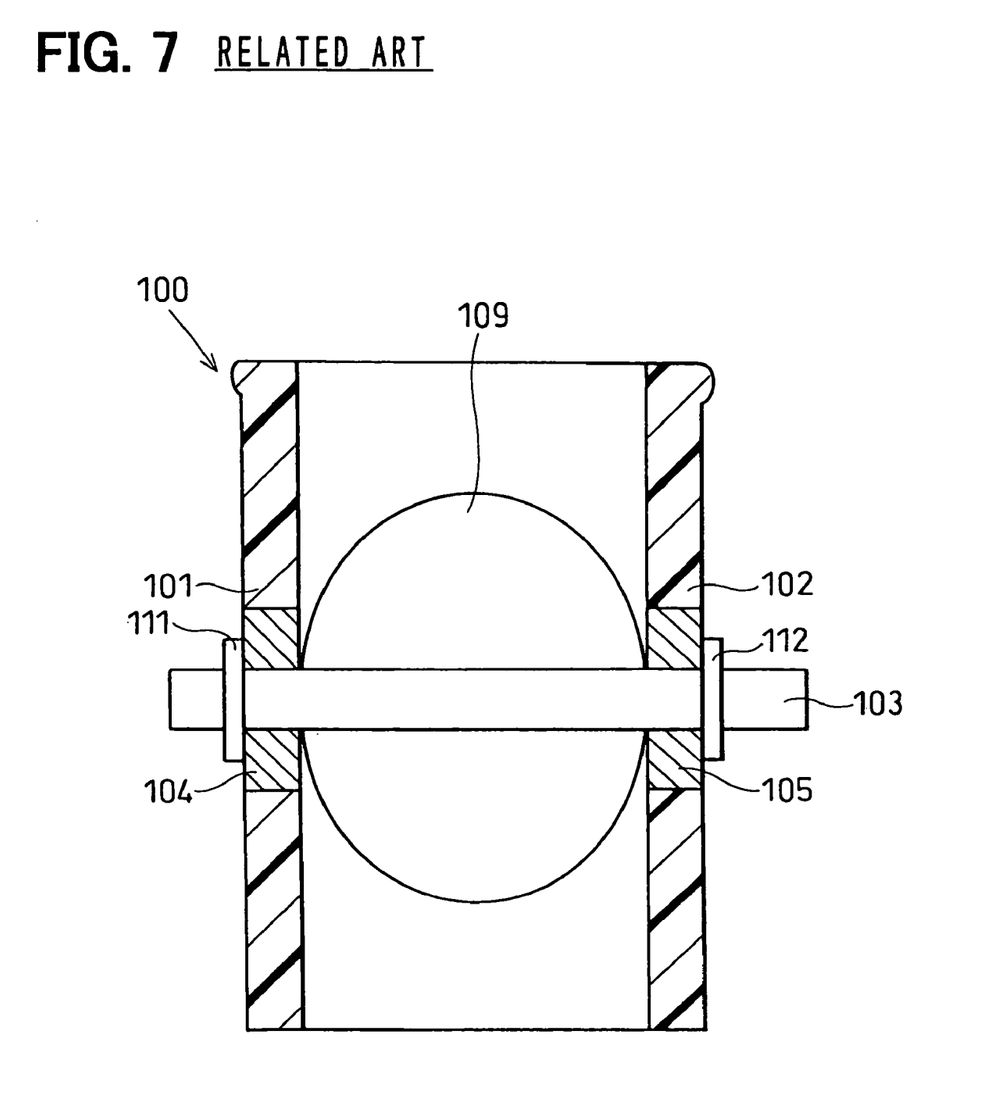
FIG. 7 is a partially cross-sectional side view showing a throttle apparatus according to a related art.

According to an example shown in FIG. 7, a throttle body 100 includes a first boss portion 101 and a second boss portion 102, into which a first bearing 104 and a second bearing 105 are respectively assembled. The first bearing 104 and the second bearing 105 respectively have a first shaft hole and a second shaft hole, through which the throttle shaft 103 penetrates. The throttle shaft 103 is axially inserted by thrust restricting means 111, 112 such as an E-ring and a C-ring. Specifically, the thrust restricting means 111, 112 are additionally assembled from both axial end sides of the throttle shaft 103. Thus, the throttle shaft 103 is restricted from moving axially with respect to the first boss portion 101 and the second boss portion 102. The throttle shaft 103 internally forms a rectangular hole (valve holding portion), into which the throttle valve 309 is inserted, so that the throttle valve 309 is partially received in the throttle shaft 103.

Figure 8:
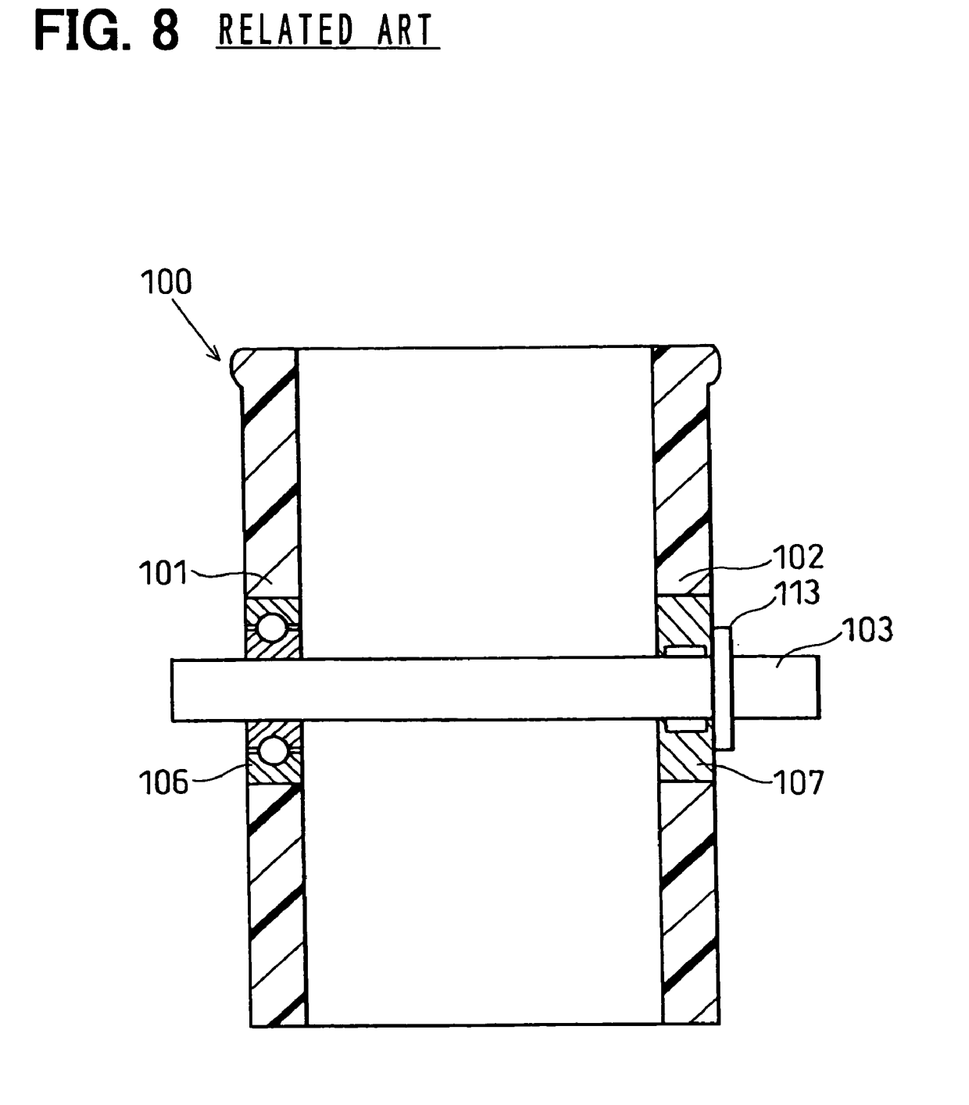
FIG. 8 is a partially cross-sectional side view showing a throttle apparatus according to a related art.

According to an example shown in FIG. 8, the throttle body 100 has the first boss portion 101, into which an outer ring of a ball bearing 106 is press-inserted. The throttle shaft 103 is press-inserted into an inner ring of the ball bearing 106. A needle bearing 107 is assembled into the second boss portion 102 of the throttle body 100. The throttle shaft 103 is press-inserted into the needle bearing 107, and a thrust restricting means 113 such as an E-ring and a C-ring is additionally assembled from axially end side of the throttle shaft 103 to restrict the throttle shaft 103 from moving axially with respect to the first boss portion 101 and the second boss portion 102.

In the above thrust supporting structure of the throttle shaft 103, additional assembling process is needed. Specifically, the throttle shaft 103 needs to be assembled into the bearing received in the first boss portion 101 and the bearing received in the second boss portion 102. Besides, the thrust restricting means 111, 112, 113 need to be additionally assembled to both axial ends of the throttle shaft 103 located in the vicinity of the bearings 104, 105, 106, 107. Accordingly, a number of components of the throttle apparatus increases, and an additional assembling process is needed. As a result, cost of the throttle apparatus increases.

SUMMARY OF THE INVENTION

In view of the foregoing problems, it is an object of the present invention to propose a throttle apparatus, in which displacement of a throttle shaft is restricted in its thrust direction without increasing a number of components and product cost.

According to the present invention, a throttle apparatus for an internal combustion engine includes a throttle body, a first bearing, a second bearing, a throttle shaft, and a throttle valve. The throttle body includes a cylindrical bore wall part that internally forms an intake air passage. The bore wall part includes a first bearing supporting portion and a second bearing supporting portion. The first bearing supporting portion is arranged on a first end side of the bore wall part in a radial direction of the bore wall part. The radial direction of the bore wall part is substantially perpendicular to the central axis of the cylindrical bore wall part. The second bearing supporting portion is arranged on a second end side of the bore wall part in the radial direction of the bore wall part. The first bearing is supported by the first bearing supporting portion. The first bearing internally forms a first sliding hole. The second bearing is supported by the second bearing supporting portion. The second bearing internally forms a second sliding hole. The throttle shaft is supported by the first sliding hole formed in the first bearing on an axially first end side of the throttle shaft slidably in a rotating direction. The throttle shaft is supported by the second sliding hole formed in the second bearing on an axially second end side of the throttle shaft slidably in the rotating direction. The throttle valve is supported by the throttle shaft so that the throttle valve integrally rotates with the throttle shaft to control an amount of intake air flowing into the internal combustion engine.

The throttle body is integrally molded of a resinous material. The first bearing has a first thrust restricting means that is integrally formed with the first bearing of the same material as a material of the first bearing. The second bearing has a second thrust restricting means that is integrally formed with the second bearing of the same material as a material of the second bearing. The throttle shaft is at least partially inserted between the first thrust restricting means and the second thrust restricting means from both axially end sides of the throttle shaft to restrict the throttle shaft from moving axially with respect to the first bearing supporting portion and the second bearing supporting portion of the bore wall part.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
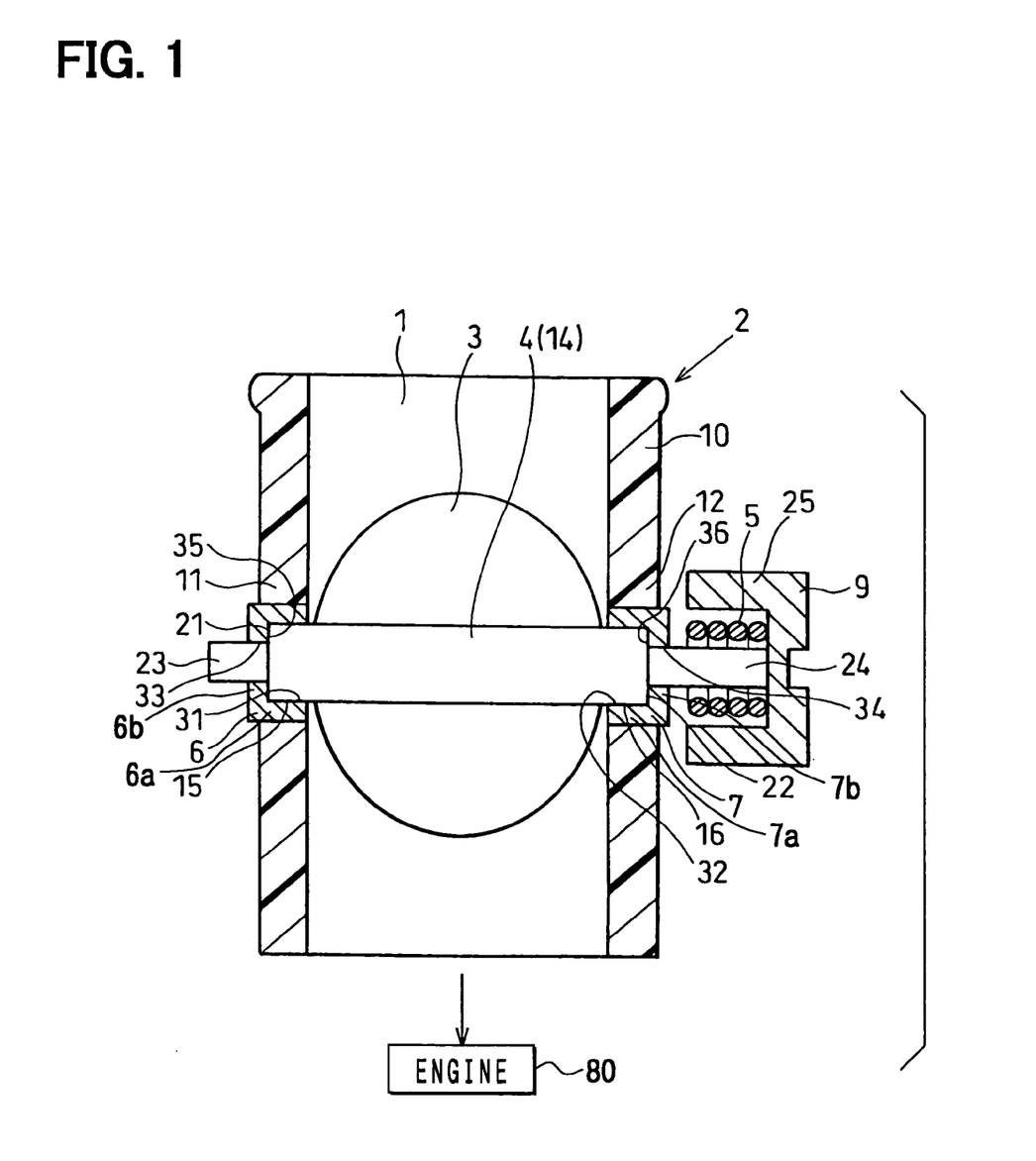
FIG. 1 is a partially cross-sectional side view showing a throttle apparatus according to a first embodiment of the present invention.
Figure 2:
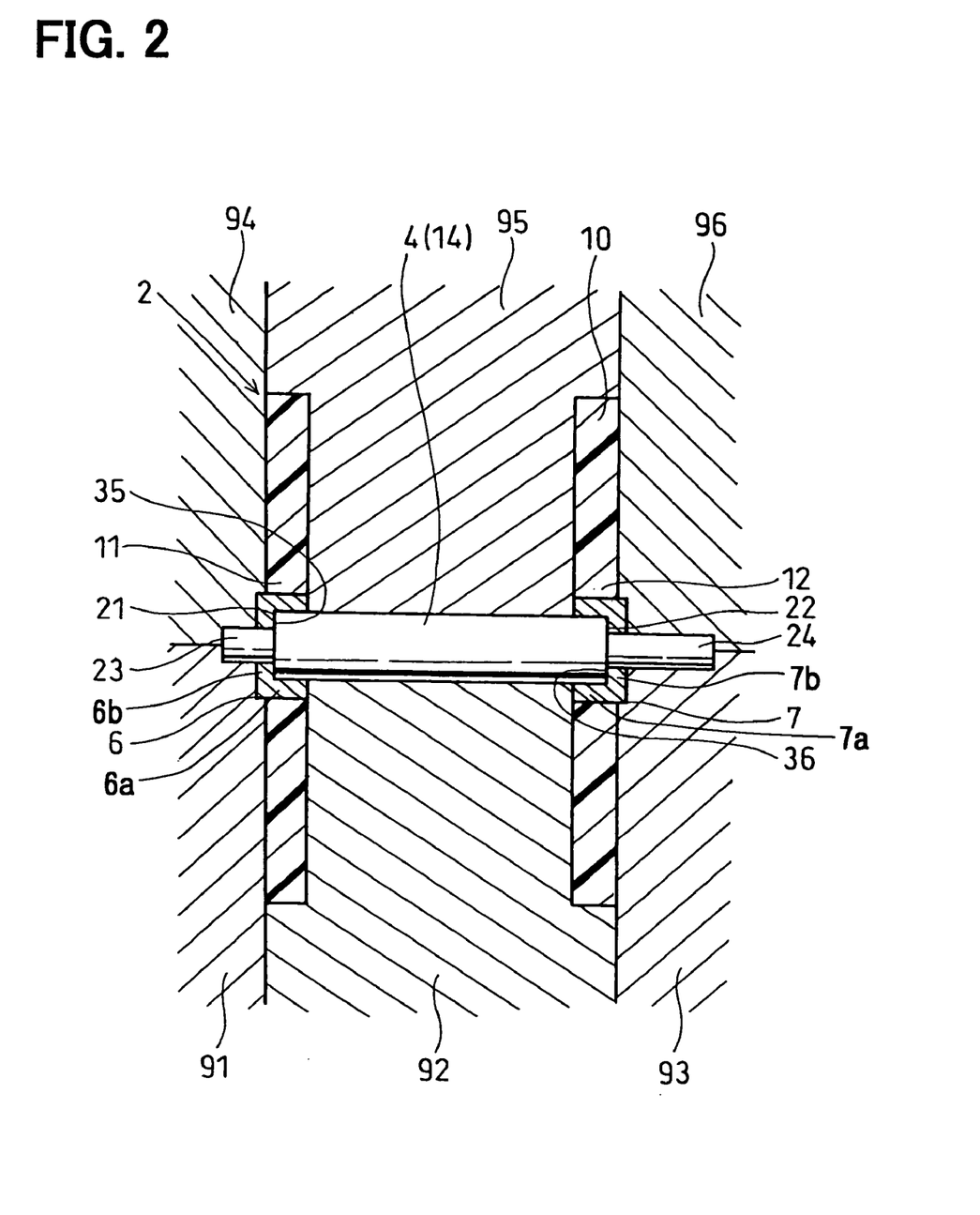
FIG. 2 is a cross-sectional side view showing a throttle body of the throttle apparatus molded in dies.

As shown in FIGS. 1 to 2, a throttle apparatus is constructed with a throttle body 2, a throttle valve 3, a throttle shaft 4, a power unit (not shown), a return spring 5, and an ECU (electronic control unit, not shown).

The throttle body 2 internally forms an intake air passage 1 introducing intake air into cylinders of an internal combustion engine 80, such as a gasoline engine. The throttle valve 3 controls an amount of intake air flowing through the intake air passage 1 toward the cylinders of the engine 80. The throttle shaft 4 is arranged to radially penetrate the throttle body 2, so that the throttle shaft 4 is rotatably supported by the throttle body 2.

The power unit serves as a valve actuating means to rotate the throttle valve 3 in an open direction, in which the throttle valve 3 is opened to be in a full throttle position (full open position), or a close direction, in which the throttle valve 3 is closed to be in an idling position (full close position). The return spring 5 serves as a valve urging means to urge the throttle valve 3 in the close direction. The ECU electrically controls a throttle position of the throttle valve 3 in accordance with an operation degree of an accelerator pedal stepped by a driver.

The power unit includes a driving motor (not shown) serving as a power source and a reduction gear (not shown) reducing rotation speed of the driving motor by a predetermined reduction ratio to be a predetermined rotation speed. The ECU is connected to an accelerator position sensor (not shown) that detects an operation degree (accelerator operation amount) of the accelerator pedal stepped by a driver. The operation degree of the accelerator pedal is converted into an electronic signal (accelerator position signal), and output to the ECU. The accelerator position signal represents the accelerator operation amount. The throttle apparatus has an angular sensor (throttle position sensor, not shown) that detects an opening degree, i.e., rotation angle of the throttle valve 3. The opening degree of the throttle valve 3 is converted into an electronic signal (throttle position signal), and output to the ECU. The throttle position signal represents an opening degree of the throttle valve 3. The ECU performs feedback control with respect to the driving motor in order to eliminate deviation between the throttle position signal transmitted from the throttle position sensor and the accelerator position signal transmitted from the accelerator position sensor.

The throttle position sensor is constructed with permanent magnets, yokes (not shown), a detecting element and the like. The permanent magnets are constructed with separated pieces of magnets provided on one end portion of the throttle shaft 4 for generating a magnetic field. The yokes are constructed with separated pieces, and magnetized by the permanent magnets. The detecting element, such as a hall element, a hall IC and a magnetic resistance element are provided inside the yokes to detect magnetic field generated by the permanent magnet. The detecting element is arranged to oppose to the permanent magnet for detecting a rotation angle of the throttle valve 3 in a noncontact manner. The detecting element is integrally arranged in a sensor cover (not sown) assembled to an outer wall of the throttle body 2. The separated permanent magnets and the separated yokes are secured to the inner periphery of a valve gear 9, which constructs the reduction gears, using glue or the like.

The throttle body 2 having a substantially cylindrical shape is integrally molded of a thermo stable resinous material, such as PPS (poly phenylene sulfide), PBTG30 (poly butylene terephthalate including grass fiber by 30%), PA (polyamide), PP (polypropylene) or PEI (polyetherimide). The throttle body 2 is a throttle housing that includes the substantially cylindrical-shaped bore wall part 10 internally forming a circular-shaped intake air passage 1, through which intake air flows into the engine 80. The bore wall part 10 internally receives the disc-shaped throttle valve 3, such that the throttle valve 3 can open and close the circular-shaped intake air passage 1 formed in the bore wall part 10. The bore wall part 10 rotatably receives the throttle valve 3 in the intake air passage (bore) 1, such that the throttle valve 3 can rotate from the full close position to the full open position. The throttle body 2 is screwed onto an intake manifold of the engine 80 using a fasting bolt or the like (not shown). Intake air filtered by an air cleaner flows into an intake air passage 1 formed in the throttle body 2 from upper side in FIG. 1, after passing through an intake pipe. The intake air flows into the cylinders of the engine 80 after passing through an intake manifold connected to the throttle body 2 from the lower side in FIG. 1.

A first boss portion (first bearing supporting portion) 11 and a second boss portion (second bearing supporting portion) 12 are integrally molded of a resinous material with the bore wall part 10. The first and second boss portions 11, 12 are arranged on both circumferential sides of the bore wall part 10 that substantially radially oppose to each other. That is, the first and second boss portions 11, 12 are arranged on both circumferential sides of the bore wall part 10 with respect to the radial direction of the bore wall part 10. The radial direction of the bore wall part 10 is substantially perpendicular to the central axis of the bore wall part 10, i.e., a direction of intake airflow passing through the intake air passage 1. The first and second boss portions 11, 12 respectively hold a first bearing 6 and a second bearing 7.

The bore wall part 10 is integrally molded of a resinous material with a gearbox part (not shown) and a motor housing part (not shown) that are arranged on the outer wall of the bore wall part 10. The gearbox part rotatably receives the reduction gears, and the motor housing part receives the driving motor. A full-close stopper is integrally molded of the resinous material with the inner wall of the gearbox part for restricting rotation of the throttle valve 3 in its closing direction at the idling position, i.e., full close position of the throttle valve 3. Here, a full-open stopper may be integrally molded with the inner wall of the gearbox part for restricting rotation of the throttle valve 3 at the full-throttle position, i.e., full open position of the throttle valve 3.

The first bearing 6 and the second bearing 7, which are respectively supported by the first and second boss portions 11, 12, respectively have a circular first shaft hole (first shaft sliding hole) 31 and a circular second shaft hole (second shaft sliding hole) 32. The first and second sliding holes 31, 32 of the first and second bearings 6, 7 respectively rotatably support a first sliding portion 15 and a second sliding portion 16, which are arranged on axially both ends of the throttle shaft 4. The radially outer faces of the first and second boss portions 11, 12 can radially protrude from the radially outer wall faces of the bore wall part 10, respectively. In this case, the first and second boss portions 11, 12 are formed to be in a substantially cylindrical shape.

The throttle valve 3 is a butterfly-type rotary valve that is controlled in its rotation angle from the full open position to the full close position to control an amount of intake air introduced into the cylinders of the engine 80. The throttle valve 3 having a substantially disc shape is inserted into a valve holding portion 14, which is a substantially rectangular thin hole formed in the throttle shaft 4, from radially outer side of the throttle shaft 4. The throttle valve 3 is screwed to the valve holding portion 14 formed in the throttle shaft 4 using a fastening bolt or the like. Thus, the throttle valve 3 and the throttle shaft 4 are fixed with each other, so that the throttle valve 3 and the throttle shaft 4 integrally rotate.

The throttle shaft 4 is made of a metallic material such as brass, stainless steel to be in a substantially round shape. The throttle shaft 4 has a rotation axis that is substantially perpendicular to the flow direction of intake air passing through the intake air passage 1 formed in the bore wall part 10 of the throttle body 2. That is, the rotation axis of the throttle shaft 4 is substantially perpendicular to the central axis of the bore wall part 10.

The throttle shaft 4 has an outer circumferential face (first sliding portion) 15 located on axially one end side (first end side, left side in FIG. 1) axially outwardly with respect to the valve holding portion 14. The first sliding portion 15 of the throttle shaft 4 slides with respect to the first sliding hole 31 formed in the first bearing 6, and rotates with respect to the first boss portion 11 of the bore wall part 10 of the throttle body 2. The throttle shaft 4 has an outer circumferential face (second sliding portion) 16 located on the other axial end side (second end side, right side in FIG. 1) axially outwardly with respect to the valve holding portion 14. The second sliding portion 16 of the throttle shaft 4 slides with respect to the second sliding hole 32 formed in the second bearing 7, and rotates with respect to the second boss portion 12 of the bore wall part 10 of the throttle body 2.

The throttle shaft 4 has a first small diameter portion 23 located on the first end side, i.e., on the left side in FIG. 1 axially outwardly with respect to the first sliding portion 15 of the throttle shaft 4. The first small diameter portion 23 of the throttle shaft 4 has a diameter smaller than the diameter of the valve holding portion 14 and the diameter of the first sliding portion 15 of the throttle shaft 4. The first small diameter portion 23 is integrally formed with the throttle shaft 4 via an annular first step portion 21 of the throttle shaft 4. The first step portion 21 of the throttle shaft 4 serves as a first supported portion that is axially restricted by a first supporting portion 35 of the first bearing 6.

The throttle shaft 4 has a second small diameter portion 24 located on the second end side, i.e., on the right side in FIG. 1 axially outwardly with respect to the second sliding portion 16 of the throttle shaft 4. The second small diameter portion 24 of the throttle shaft 4 has a diameter smaller than the diameter of the valve holding portion 14 and the diameter of the second sliding portion 16 of the throttle shaft 4. The second small diameter portion 24 is integrally formed with the throttle shaft 4 via an annular second step portion 22 of the throttle shaft 4. The second step portion 22 of the throttle shaft 4 serves as a second supported portion that is axially restricted by a second supporting portion 36 of the second bearing 7.

A valve gear 9 constructing the reduction gears is provided to the second small diameter portion 24 located on the second end side, i.e. right side of the throttle shaft 4 in FIG. 1. The valve gear 9 is crimped to the second small diameter portion 24 of the throttle shaft 4, for example. The reduction gears reduce rotation speed of the driving motor by a predetermined reduction gear ratio, and transmit driving power of the driving motor to the throttle shaft 4 as a transmission device. The reduction gears are constructed with a pinion gear (not shown), a middle reduction gear (not shown) and the valve gear 9 for driving the throttle shaft 4 that integrally rotates with the throttle valve 3. The pinion gear is secured to the motor shaft of the driving motor. The middle reduction gear engages with the pinion gear to be rotated by the pinion gear. The valve gear 9 engages with the middle reduction gear to be rotated by the middle reduction gear.

The valve gear 9 is integrally formed of a metallic material or a resinous material to be in a substantially annular shape having a gear portion (teeth portion, not shown) on its outer circumferential periphery. The gear portion of the valve gear 9 engages with the middle reduction gear. The valve gear 9 includes a cylindrical portion 25 that is integrally formed with the valve gear 9, such that the cylindrical portion 25 protrudes from the annular face of the valve gear 9 on the side of the bore wall part 10, i.e., on the side of the throttle body 2. The cylindrical portion 25 receives a return spring 5.

A full-close stopper portion (not shown) is integrally molded on the outer circumferential face of the valve gear 9 to hook on the full-close stopper internally formed in the gearbox part for restricting rotation of the throttle shaft 4. Another full-close stopper portion and/or a full-open stopper portion can be directly formed with the throttle valve 3 or the throttle shaft 4. In this case, a full-close stopper and/or a full-open stopper may be formed in the inner periphery of the bore wall part 10 of the throttle body 2.

The return spring 5 is a coil spring provided around the outer circumferential periphery of the second small diameter portion 24 of the throttle shaft 4. One end side of the return spring 5 located on the left side in FIG. 1 is supported by a body side hook (not shown) provided on an outer circumferential periphery of the bore wall part 10 of the throttle body 10, i.e., on a bottom wall surface of the gearbox part. The other end side of the return spring 5 located on the right side in FIG. 1 is supported by a gear side hook (not shown). The gear side hook is provided to a side periphery of the valve gear 9 that is located on the side of the bore wall part 10, i.e., on the side of the throttle body 2 with respect to the valve gear 9.

The first bearing 6 and the second bearing 7 are slide bearings, thrust bearings or bushes that are integrally formed of a metallic material to be in a predetermined cylindrical shape. The first bearing 6 is constructed with a first cylindrical portion 6a, a first annular portion 6b and the like. The second bearing 7 is constructed with a second cylindrical portion 7a, a second annular portion 7b and the like. The first and second cylindrical portions 6a, 7a are respectively provided inside of the first and second holes respectively formed in the first and second boss portions 11, 12 of the throttle body 2. The first and second annular portions 6b, 7b respectively plug both axial end sides of the first and second cylindrical portions 6a, 7a. The first and second sliding holes 31, 32 of the first and second bearings 6, 7 are respectively formed radially inside of the first and second cylindrical portions 6a, 7a to rotatably support the first and second sliding portions 15, 16 of the throttle shaft 4.

A first shaft hole 33 is formed inside the first annular portion 6b of the first bearing 6, and a second shaft hole 34 is formed inside the second annular portion 7b of the second bearing 7. The first and second shaft holes 33, 34 respectively rotatably support the first and second small diameter portions 23, 24 of the throttle shaft 4. The first and second small diameter portions 23, 24 of the throttle shaft 4 respectively penetrate the first and second bearings 6, 7 axially through the first and second shaft holes 33, 34.

The first supporting portion 35 is integrally formed inside the axially inner wall of the first annular portion 6b of the first bearing 6, and the second supporting portion 36 is integrally formed inside the axially inner wall of the second annular portion 7b of the second bearing 7. The first and second supporting portions 35, 36 of the first and second bearings 6, 7 respectively axially support the first and second step portions 21, 22 of the throttle shaft 4. The first and second supporting portions 35, 36 of the first and second bearings 6, 7 are respectively arranged on both axially end sides outwardly with respect to the first and second sliding holes 31, 32 of the first and second bearings 6, 7. The first and second supporting portions 35, 36 of the first and second bearings 6, 7 axially oppose to each other, so that the first and second step portions 21, 22 of the throttle shaft 4 are axially inserted by the first and second supporting portions 35, 36 of the first and second bearings 6, 7 from both axial end sides of the throttle shaft 4.

The first and second supporting portions 35, 36 of the first and second bearings 6, 7 respectively serve as a first thrust restricting means and a second thrust restricting means to restrict the throttle shaft 4 from moving axially with respect to the first and second boss portions 11, 12 of the throttle body 2. That is, the thrust restricting means are respectively integrally formed with the first and second bearings 6, 7.

An injection molding method of the throttle body 2 is explained as follows.

As shown in FIG. 2, molding dies of the throttle body 2 are constructed with fixed dies 91 to 93 and movable dies 94 to 96, and the like. The fixed dies 91 to 93 and the movable dies 94 to 96 are clamped to internally form a cavity that has a shape corresponding to shapes of the throttle body 2, the throttle shaft 4, the first bearing 6 and the second bearing 7 that are molded.

Initially, an inserted component is constructed with the first and second bearings 6, 7, and the throttle shaft 4. Specifically, the first and second bearings 6, 7 insert the throttle shaft 4 from axial end sides of the throttle shaft 4, so that the first and second step portions 21, 22 of the throttle shaft 4 are axially inserted respectively by the first and second supporting portions 35, 36 of the first and second bearings 6, 7. The inserted component constructed with the first and second bearings 6, 7, and the throttle shaft 4 is located in a predetermined position in the cavity formed in the molding dies including the fixed dies 91 to 93 and the movable dies 94 to 96.

Heated thermo plastic (filler), i.e., thermo stable plastic such as PPS or PBT in a molten state is injected into the cavity formed in the molding dies. The filler is injected into the cavity through at least one gate formed in the molding dies, so that the cavity formed in the molding dies is filled with the filler (molten resinous material), in an injection-filling process.

Subsequently, pressure applied to the filler in the molding dies is gradually increased, and the increased pressure is maintained at a pressure greater than the maximum pressure applied to the injected filler in the injection-filling process. That is, predetermined pressure greater than injection pressure is applied to the filler filled in the molding dies. Subsequently, cooling water is introduced into a cooling water passage formed around the cavity in the molding dies in a cooling process. In this situation, the filler contracts (shrinks) in the molding dies due to the cooling process. Therefore, additional filler is injected into the cavity through at least one gate formed in the molding dies to refill additional filler by an amount equivalent to a reduced volume of the molded filler due to the contraction, in a pressure holding process.

Subsequently, the filler filled in the cavity of the molding dies is taken out, and is cooled to be solidified. Alternatively, the filler filled in the cavity of the molding dies is cooled to be solidified using cooling water or the like, while the filler is received in the cavity. Thus, the throttle body 2 including the substantially cylindrical bore wall part 10 can be integrally molded.

Thus, the first and second bearings 6, 7 are respectively insert molded, i.e., inserted and formed in the throttle body 2, such that the first and second bearings 6, 7 are respectively received inside inner circumferential peripheries of the first and second holes formed in the first and second boss portions 11, 12 of the throttle body 2. The throttle shaft 4 is insert molded, i.e., inserted and formed in the bore wall part 8, such that the first and second step portions (first and second supported portions) 21, 22 of the throttle shaft 4 are axially inserted by the first and second supporting portions 35, 36 formed in the first and second bearings 6, 7 from both axial end sides of the throttle shaft 4. Therefore, the first and second supporting portions 35, 36 of the first and second bearings 6, 7 respectively restrict the throttle shaft 4 from moving axially with respect to the first and second boss portions 11, 12 of the throttle body 2.

Thus, the throttle shaft 4, the first and second bearings 6, 7 are insert molded, i.e., inserted and formed in the first and second boss portions 11, 12 of the bore wall part 10 of the throttle body 2, when the throttle body 2 is molded in the same molding dies, in this injection molding process of the throttle body 2. That is, when the throttle body 2 is molded in the predetermined substantially cylindrical shape, the throttle shaft 4, the first and second bearings 6, 7 are insert molded and assembled in the first and second boss portions 11, 12 of the bore wall part 10 of the throttle body 2.

Therefore, an assembling process of the first and second bearings 6, 7 can be reduced. Specifically, the first and second bearings 6, 7 need not to be respectively secured, e.g., press-inserted into the first and second holes formed in the first and second boss portions 11, 12 of the throttle body 2, after a molding process of the throttle body 2. Besides, an assembling process of the throttle shaft 4 can be also reduced. Specifically, the throttle shaft 4 need not to be assembled into the first and second sliding holes 31, 32 of the first and second bearings 6, 7, after the molding process of the throttle body 2.

Furthermore, the first and second step portions 21, 22 of the throttle shaft 4 are axially inserted by the first and second supporting portions 35, 36 of the first and second bearings 6, 7 from both axial end sides of the throttle shaft 4. Therefore, the throttle shaft 4 can be restricted from moving axially, without additional thrust restricting means, such as an E-ring and a C-ring. Accordingly, the number of components of the throttle apparatus can be reduced, and an assembling process and a forming process of the throttle apparatus can be also reduced, so that cost of the throttle apparatus can be reduced.

As follows, an operation of the throttle apparatus is described. When the driver steps the accelerator pedal of the vehicle, the accelerator position signal, which is transmitted from the accelerator position sensor to the ECU, changes. The ECU controls electric power supplied to the driving motor, so that the shaft of the driving motor is rotated and the throttle valve 3 is operated to be in a predetermined throttle position, i.e., rotation angle. The torque of the driving motor is transmitted to the valve gear 9 via the pinion gear and the middle reduction gear. Thus, the valve gear 9 rotates by a rotation angle corresponding to the stepping degree of the accelerator pedal, against urging force generated by the return spring 5.

Therefore, the valve gear 9 rotates, and the throttle shaft 4 also rotates by the same angle as the rotation angle of the valve gear 9, so that the throttle valve 3 rotates from its full close position toward its full open position in the open direction. As a result, the intake air passage 1 formed in the bore wall part 10 of the throttle body 2 is opened by a predetermined degree, so that rotation speed of the engine 80 is changed to be a rotation speed corresponding to the stepping degree, i.e., accelerator operating amount of the accelerator pedal by the driver.

By contrast, when the driver releases the accelerator pedal, the throttle valve 3, the throttle shaft 4, the valve gear 9 and the like return to an initial position of the throttle valve 3 by urging force of the return spring 5. The initial position of the throttle valve 3 is an idling position or the full close position of the throttle valve 3. When the driver releases the accelerator pedal, the value of the accelerator position signal transmitted by the accelerator position sensor becomes substantially 0%. Therefore, in this situation, the ECU can supply electric power to the driving motor in order to rotate the motor shaft of the driving motor in its reverse direction, so that the throttle valve 3 is controlled at its full close position. In this case, the throttle valve 3 can be rotated in the close direction by the driving motor.

The throttle valve 3 rotates in the close direction by urging force of the return spring 5 until the full-close stopper portion provided on the valve gear 9 contacts the full-close stopper integrally molded on the inner wall of the gearbox part of the throttle body 2. Rotation of the throttle valve 3 is restricted at the full close position of the throttle valve 3 by the full-close stopper. Therefore, the throttle valve 3 is maintained in the predetermined full close position, i.e., idling position, in the intake air passage 1 formed in the bore wall part 10 of the throttle body 2. Thus, the intake air passage 1 connected to the engine 80 is substantially closed, so that rotation speed of the engine 80 is set at a predetermined idling speed.

In this throttle apparatus, a number of components and a cost of each component can be reduced, so that a cost of the throttle apparatus can be reduced. Besides, looseness of the throttle shaft 4 is restricted in its thrust direction, i.e., axial direction. Accordingly, when a noncontacting detecting element, such as a hall element, hall IC and a magnetic resistance element of a rotation angle detecting sensor is arranged to oppose to a magnet, which is provided on one axial end of a throttle shaft, detection accuracy of the angular sensor can be enhanced. Furthermore, when the throttle valve 3 reaches its full close position in its closing operation, the inner wall face (bore inner wall face) of the bore wall part 10 and the outer circumferential periphery of the throttle valve 3 may not interfere with each other. Accordingly, a defect such as scratch, chipping and flaw may not be caused in the bore wall part 10 and the throttle valve 3. Besides, the throttle valve 3 and the throttle shaft 4 can be smoothly operated, and a throttle position, i.e., engine rotation speed can be promptly controlled corresponding to an accelerator position operated by the driver, so that drivability of the vehicle can be enhanced. Furthermore, airtightness of the throttle valve 3 in its full close position can be enhanced, so that a gap formed between the inner wall face (bore inner wall face) of the bore wall part 10 of the throttle body 2 and the outer circumferential periphery of the throttle valve 3 can be maintained in a predetermined amount, when the throttle valve 3 is in its full close position. Therefore, an amount of intake air flowing into the cylinders of the engine 80 can be maintained at a predetermined amount in the idling operation of the vehicle, and the idling rotation speed corresponds to a predetermined rotation speed. Thus, fuel efficiency of the vehicle can be enhanced in the idling operation, when fuel injection amount is controlled in accordance with the amount of intake air.

Second Embodiment

Figures 3A, 3D:
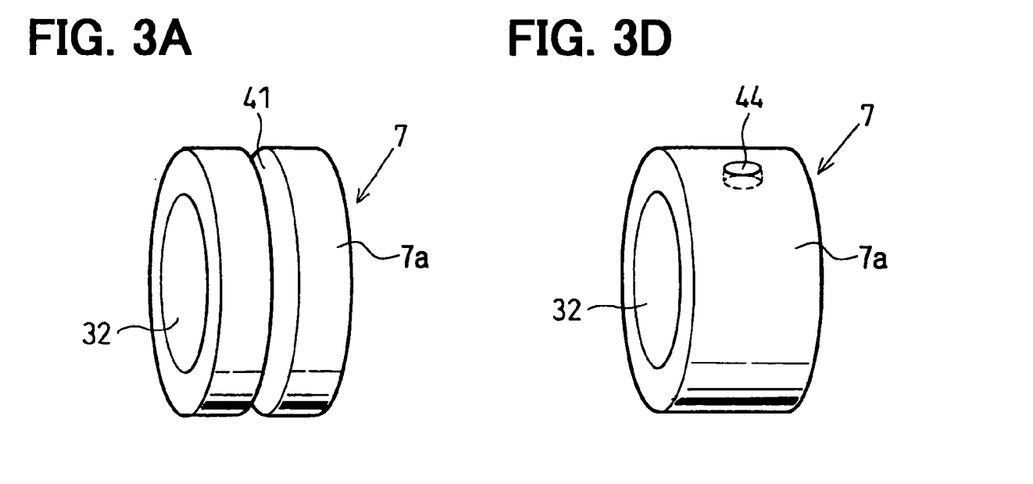
FIGS. 3A to 3E are perspective views showing bearings according to a second embodiment of the present invention.

As shown in FIG. 3A, a circumferential groove (second bearing restricting means) 41 is formed in the outer circumferential face of the second cylindrical portion 7a of the second bearing 7, in this embodiment. Therefore, when the throttle body 2 is molded of a resinous material, filler (molten resinous material) forming the inner circumferential periphery of the second hole of the second boss portion 12 of the throttle body 2 flows into the circumferential groove 41 of the second bearing 7. Accordingly, adhesive strength, i.e., joint strength between the resinous material forming the throttle body 2 and the second bearing 7 can be enhanced, so that the second bearing 7 can be restricted from moving axially and rotating circumferentially with respect to the second boss portion 12 of the throttle body 2. Furthermore, a circumferential groove (first bearing restricting means, not shown) can be formed in the outer circumferential face of the first cylindrical portion 6a of the first bearing 6, so that the first bearing 6 can be restricted from moving axially and rotating circumferentially with respect to the first boss portion 11 of the throttle body 2.

Thus, the throttle shaft 4, which is rotatably supported by the first and second boss portions 11, 12 of the throttle body 2 via the first and second bearings 6, 7, can be restricted from axial moving caused by axial displacement of the first and second supporting portions 35, 36 of the first and second bearings 6, 7. Besides, the first and second bearings 6, 7, can be restricted from rotating circumferentially caused by rotation of the throttle shaft 4. That is, a rotation restricting structure can be additionally formed in the first and second bearings 6, 7. Thus, the throttle shaft 4 can be steadily operated, so that controllability of the throttle valve 3 can be enhanced. Therefore, throttle position, i.e., engine rotation speed can be promptly controlled corresponding to an accelerator position operated by the driver, so that drivability can be enhanced.

Figure 3B:
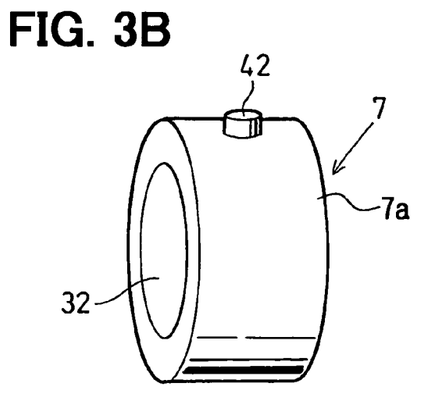

As shown in FIG. 3B, a protrusion (second bearing restricting means) 42 can be formed in the outer circumferential face of the second cylindrical portion 7a of the second bearing 7. In this structure, similar effect as that of the circumferential groove 41 can be produced. A protrusion (first bearing restricting means, not shown) can be similarly formed in the outer circumferential face of the first cylindrical portion 6a of the first bearing 6.

Figure 3C:
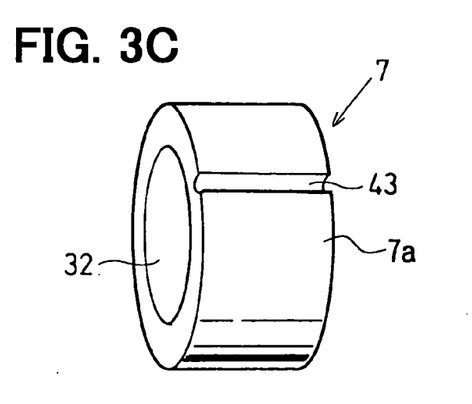

As shown in FIG. 3C, an axial groove (second bearing restricting means) 43 can be formed in the outer circumferential face of the second cylindrical portion 7a of the second bearing 7. In this structure, similar effect as that of the circumferential groove 41 can be produced. An axial groove (first bearing restricting means, not shown) can be similarly formed in the outer circumferential face of the first cylindrical portion 6a of the first bearing 6.

As shown in FIG. 3D, a circular pit (second bearing restricting means) 44 can be formed in the outer circumferential face of the second cylindrical portion 7a of the second bearing 7. In this structure, similar effect as that of the circumferential groove 41 can be produced. A circular pit (first bearing restricting means, not shown) can be similarly formed in the outer circumferential face of the first cylindrical portion 6a of the first bearing 6.

Figure 3E:
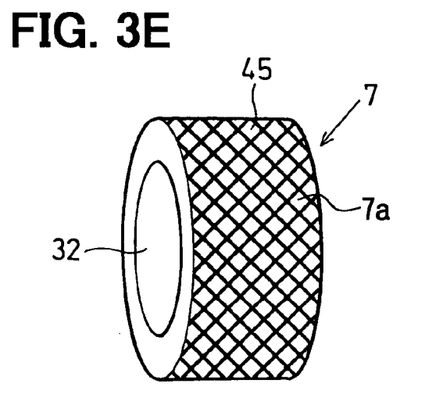

As shown in FIG. 3E, a groove portion (second bearing restricting means) 45 can be formed in the outer circumferential face of the second cylindrical portion 7a of the second bearing 7. The groove portion 45 has protrusions and recessions, such as multiple reticulations or multiple lattices formed by knurling or the like. In this structure, similar effect as that of the circumferential groove 41 can be produced. A groove portion (first bearing restricting means, not shown) can be similarly formed in the outer circumferential face of the first cylindrical portion 6a of the first bearing 6.

Third Embodiment

Figure 4:
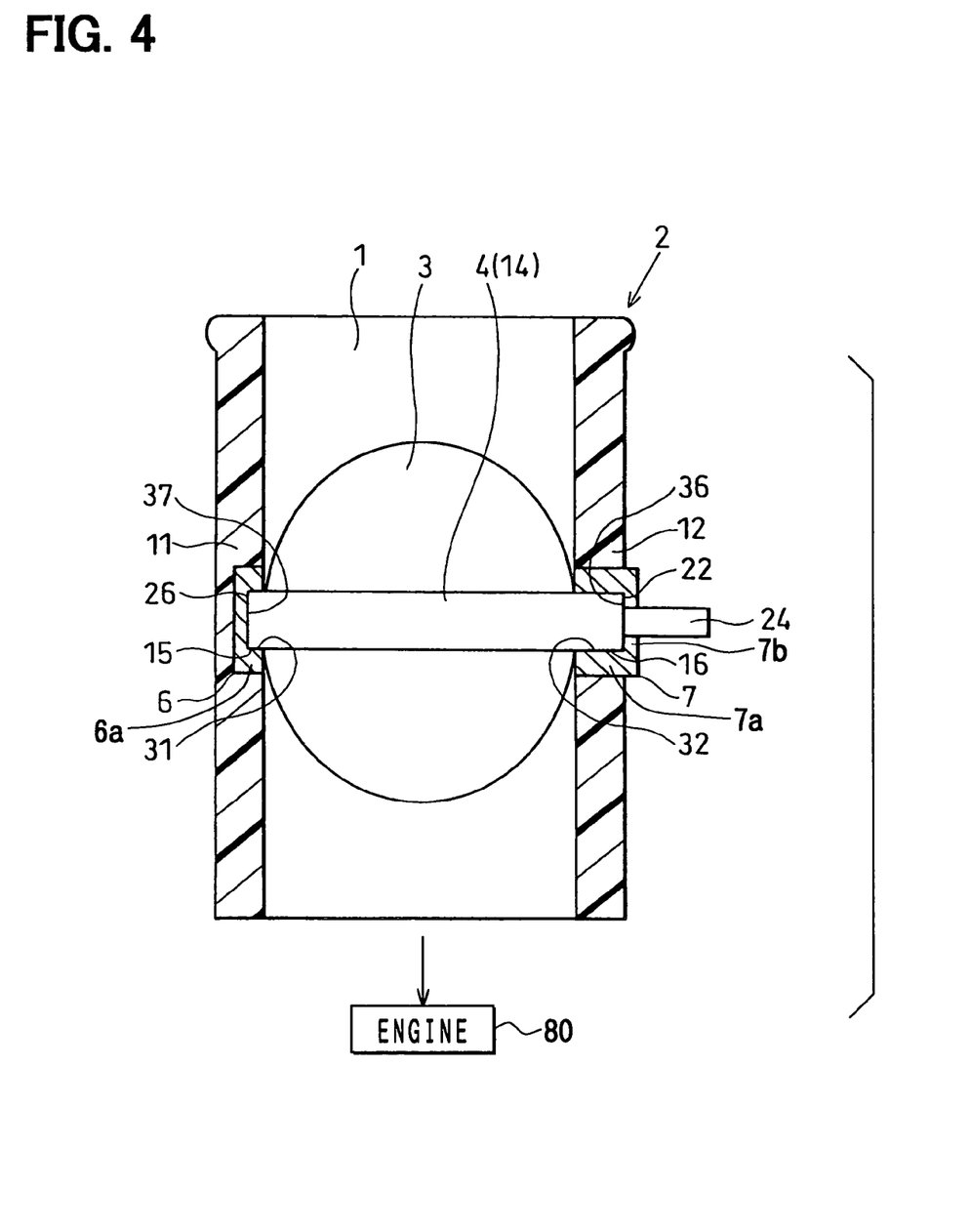
FIG. 4 is a partially cross-sectional side view showing a throttle apparatus according to a third embodiment of the present invention.

As shown in FIG. 4, in the third embodiment, a circular first restricted portion 26 is integrally formed on one end side, i.e., first end side of the throttle shaft 4 on the left side in FIG. 4. The first supported portion (first step portion) 26 is located on the axially end side outwardly with respect to the first sliding portion 15 of the throttle shaft 4, and supported by a first supporting portion 37 of the first bearing 6. The first bearing 6 is constructed with a first cylindrical portion 6a, a first annular portions 6b and the like. The first cylindrical portion 6a of the first bearing 6 is provided inside the first hole formed in the first boss portion 11 of the throttle body 2. The first annular portion 6b plugs axially one end side, i.e., first end side of the first cylindrical portion 6a on the left side in FIG. 4.

The first supporting portion 37 is integrally formed on the axially bottom wall face of the first annular portion 6b to support the circular first supported portion 26 of the throttle shaft 4. The first and second supporting portions 37, 36 of the first and second bearings 6, 7 are arranged on both axial end sides outwardly with respect to the first and second sliding holes 31, 32 of the first and second bearings 6, 7 to axially oppose to each other. The first and second step portions (supported portions) 26, 22 of the throttle shaft 4 are axially inserted by the first and second supporting portions 37, 36 of the first and second bearings 6, 7 from both axial end sides of the throttle shaft 4. The first and second supporting portions 37, 36 of the first and second bearings 6, 7 respectively serve as a first and second thrust restricting means to restrict the throttle shaft 4 from moving axially with respect to the first and second boss portions 11, 12 of the throttle body 2.

Fourth Embodiment

Figure 5:
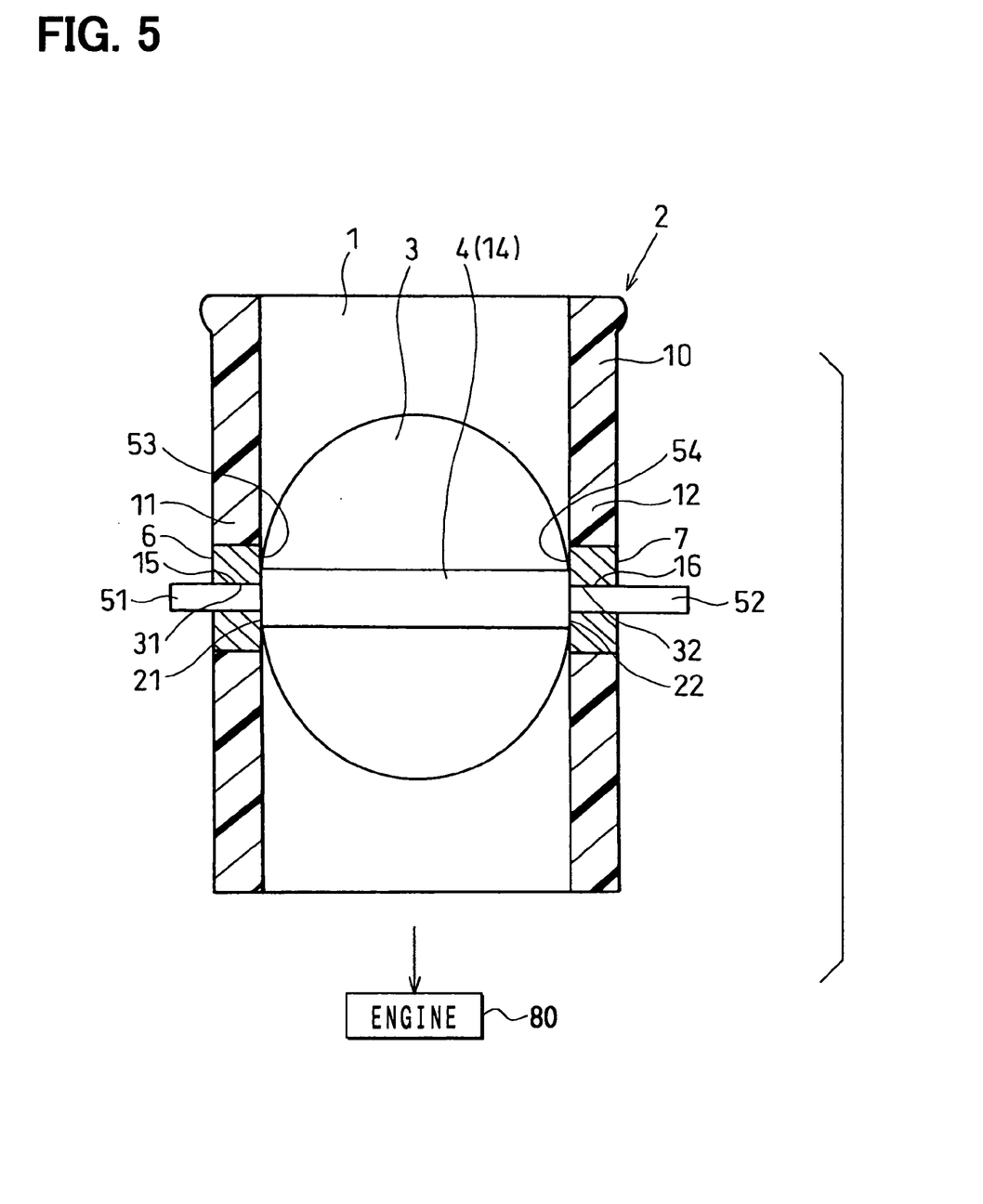
FIG. 5 is a partially cross-sectional side view showing a throttle apparatus according to a fourth embodiment of the present invention.

As shown in FIG. 5, in the fourth embodiment, a first small diameter portion 51 is integrally formed on one end side (first end side) of the throttle shaft 4 on the left side in FIG. 5 via the annular first step portion 21 of the throttle shaft 4. The first step portion 21 of the throttle shaft 4 serves as the first supported portion that is axially restricted by a first supporting portion 53 of the first bearing 6. The first small diameter portion 51 has a diameter smaller than the diameter of the valve holding portion 14 of the throttle shaft 4.

A second small diameter portion 52 is integrally formed on the other end side (second end side) of the throttle shaft 4 on the right side in FIG. 4 via the annular second step portion 22 of the throttle shaft 4. The second step portion 22 of the throttle shaft 4 serves as the second supported portion that is axially restricted by a second supporting portion 54 of the second bearing 7. The second small diameter portion 52 has a diameter smaller than the diameter of the valve holding portion 14 of the throttle shaft 4.

The outer peripheries of the first and second small diameter portions 51, 52 serve as the first and second sliding portions 15, 16. The first and second sliding portions 15, 16 respectively rotatably slide with respect to the first and second boss portions 11, 12 of the bore wall portion 10 of the throttle body 2 via the first and second sliding holes 31, 32 of the first and second bearings 6, 7.

The first and second bearings 6, 7 are integrally formed of a metallic material to be in a predetermined substantially cylindrical shape. The first and second sliding holes 31, 32 are respectively formed inside the first and second bearings 6, 7 to rotatably support the first and second sliding portions 15, 16 of the throttle shaft 4. Annular shaped first and second supporting portions 53, 54 are integrally formed respectively on the axially inner end faces of the first and second bearings 6, 7, which oppose to each other, to respectively support the first and second step portions (supported portions) 21, 22 of the throttle shaft 4.

The first and second supporting portions 53, 54 of the first and second bearings 6, 7 are arranged to axially oppose to each other from both axially end sides with respect to the valve holding portion 14 of the throttle shaft 4.

Both the annular axial end faces, i.e., first and second step portions (supported portions) 21, 22 of the valve holding portion 14 of the throttle shaft 4 is axially inserted by the first and second supporting portions 53, 54 from both axial end sides of the throttle shaft 4. The first and second supporting portions 53, 54 of the first and second bearings 6, 7 respectively serve as a first and second thrust restricting means to restrict the throttle shaft 4 from moving axially with respect to the first and second boss portions 11, 12 of the throttle body 2. In this embodiment, the first and second small diameter portions 51, 52 of the throttle shaft 4 respectively penetrate the first and second sliding holes 31, 32 of the first and second bearings 6, 7.

Fifth Embodiment

Figure 6:
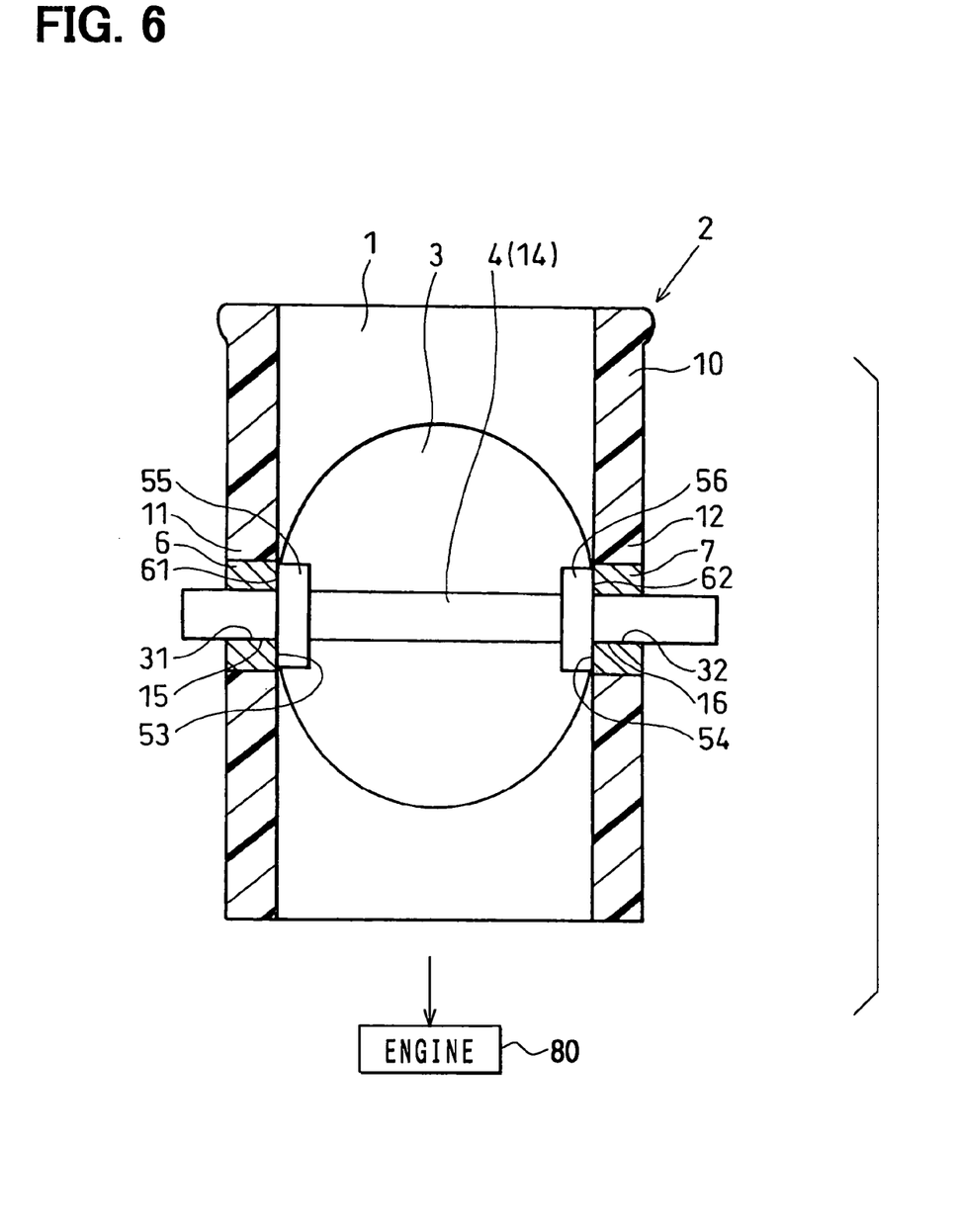
FIG. 6 is a partially cross-sectional side view showing a throttle apparatus according to a fifth embodiment of the present invention.

As shown in FIG. 6, in the fifth embodiment, a first large diameter portion 55 is integrally formed on one end side (first end side) of the throttle shaft 4 on the left side in FIG. 6. The first large diameter portion 55 has a diameter larger than the diameter of the valve holding portion 14 and the first sliding portions 15 of the throttle shaft 4. An annular first supported portion 61 is integrally formed on one end face (first end side) of the first large diameter portion 55 on the left side in FIG. 6, axially outwardly with respect to the first large diameter portion 55. The annular first supported portion 61 is axially received by a first supporting portion 53 of the first bearing 6.

A second large diameter portion 56 is integrally formed on the other end side (second end side) of the throttle shaft 4 on the right side in FIG. 6. The second large diameter portion 56 has a diameter larger than the diameter of the valve holding portion 14 and the second sliding portions 15 of the throttle shaft 4. An annular second supported portion 62 is integrally formed on the other end face (second end face) of the second large diameter portion 56 on the right side in FIG. 6, axially outwardly with respect to the second large diameter portion 56. The annular second supported portion 62 is axially received by a second supporting portion 54 of the second bearing 7.

The outer circumferential faces of the throttle shaft 4, which are located on the axially end sides outwardly with respect to the first and second large diameter portions 55, 56, respectively serve as the first and second sliding portions 15, 16. The first and second sliding portions 15, 16 respectively rotatably slide with respect to the first and second boss portions 11, 12 of the bore wall portion 10 of the throttle body 2 via the first and second sliding holes 31, 32 formed in the first and second bearings 6, 7.

The first and second bearings 6, 7 are integrally formed of a metallic material to be in a predetermined substantially cylindrical shape. The first and second sliding holes 31, 32 are respectively formed inside the first and second bearings 6, 7 to rotatably support the first and second sliding portions 15, 16 of the throttle shaft 4. Annular shaped first and second supporting portions 53, 54 are integrally formed respectively on the axially inner end faces of the first and second bearings 6, 7, which axially oppose to each other, similarly to the fourth embodiment. The first and second supporting portions 53, 54 respectively support the first and second supported portions 61, 62 of the first and second large diameter portions 55, 56 of the throttle shaft 4. In this embodiment, both the axially end portions of the throttle shaft 4 respectively penetrate the first and second sliding holes 31, 32 formed in the first and second bearings 6, 7.

Other Embodiment

The above throttle body 2 may be applied to a throttle apparatus, which does not have a driving motor, used for an internal combustion engine. In this case, a lever part, which is mechanically connected to an accelerator pedal via a wire cable, is provided instead of the valve gear 9 that is provided on the end of the throttle shaft 4. In this structure, the accelerator position operated by a driver can also be transmitted to the throttle valve 3 and the throttle shaft 4.

The throttle shaft 4 or at least one of the first and second bearings 6, 7 can be integrally molded of a resinous material. In this case, when the throttle body 2 is molded of a resinous material, the throttle shaft 4 or at least one of the first and second bearings 6, 7 can be molded in the same molding dies as that of the throttle body 2 substantially simultaneously with molding the throttle body 2.

Both of the throttle valve 3 and the throttle shaft 4 can be integrally formed of a metallic material. Alternatively, both of the throttle valve 3 and the throttle shaft 4 can be integrally molded of a resinous material. When both of the throttle valve 3 and the throttle shaft 4 are integrally molded of a resinous material, at least one of the throttle valve 3 and the throttle shaft 4 can be molded in the same molding dies as that of the throttle body 2 substantially simultaneously with molding the throttle body 2.

The throttle valve (resinous valve) 3 can be constructed with resinous disc portions, e.g., two hemicycle portions and a resinous shaft (cylindrical portion). A metallic shaft 4 can be insert molded in the resinous shaft of the throttle valve 3. The resinous shaft (cylindrical portion) can be formed on the outer circumferential periphery of the valve holding portion 14 of the throttle shaft 4 (metallic shaft), and a resinous shaft portion formed with the throttle valve 3 and a resinous shaft portion formed with the throttle shaft 4 can be welded with each other.

When the first and second sliding portions 15, 16 of the throttle valve 3 are rotatably received in the first and second sliding holes 31, 32 of the first and second bearings 6, 7 in an upstream process prior to the injection molding process of the throttle body 2, lubricant can be put on sliding portions. Specifically, highly lubricative material, such as fluorocarbon resin or molybdenum disulfide can be respectively put between the inner circumferential faces of the first and second sliding hole 31, 32 of the first and second bearings 6, 7 and the outer circumferential faces of the first and second sliding portions 15, 16 of the throttle valve 3. Thus, controllability of the throttle valve 3 can be further improved.

A cylindrical-shaped permanent magnet can be used as a magnetic field source, instead of the separated permanent magnets.

The filler can be simultaneously injected from plural gates into the cavity of the dies while the dies are clamped with each other in the filling process and/or the pressure holding process. Alternatively, the filler can be injected from the plural gates into the cavity of the dies by multiple times while the dies are clamped with each other in the filling process and/or the pressure holding process.

Various modifications and alternations may be made to the above embodiments without departing from the spirit of the present invention.

What is claimed is:

1. A throttle apparatus for an internal combustion engine, the throttle apparatus comprising:
   a throttle body that includes a cylindrical bore wall part defining an intake air passage, the bore wall part including,
      a first bearing supporting portion that is arranged on a first end side of the bore wall part in a radial direction of the bore wall part which is substantially perpendicular to a central axis of the cylindrical bore wall part, and
      a second bearing supporting portion that is arranged on a second end side of the bore wall part in the radial direction of the bore wall part,
   a first beating that is supported by the first bearing supporting portion, the first bearing defining a first sliding hole;
   a second bearing that is supported by the second bearing supporting portion, the second bearing defining a second sliding hole;
   a throttle shaft that is supported by the first sliding hole of the first bearing on an axially first end side of the throttle shaft slidably in a rotating direction, and is supported by the second sliding hole of the second bearing on an axially second end side of the throttle shaft slidably in the rotating direction; and
   a throttle valve that is supported by the throttle shaft so that the throttle valve integrally rotates with the throttle shaft to control an amount of intake air flowing into the internal combustion engine,
   wherein the throttle body is integrally molded of a resinous material,
   the first bearing has a first thrust restricting means that is integrally formed with the first bearing,
   the first thrust restricting means is formed of a same material as a material of the first bearing,
   the second bearing has a second thrust restricting means that is integrally formed with the second bearing,
   the first thrust restricting means is formed of a same material as a material of the second bearing, and
   the throttle shaft is at least partially inserted between the first thrust restricting means and the second thrust restricting means from both axially end sides of the throttle shaft to restrict the throttle shaft from moving axially with respect to the first bearing supporting portion and the second bearing supporting portion,
   wherein the throttle shaft includes a valve holding portion that is integrally formed with the throttle shaft to steadily hold the throttle valve in the intake air passage,
   the throttle shaft includes a first sliding portion that is integrally formed with the throttle shaft on the axially first end side axially outwardly with respect to the valve holding portion,
   the first sliding portion slides inside of the first sliding hole of the first bearing in the rotation direction of the throttle shaft so that the first sliding portion is rotatably supported by the first bearing supporting portion via the first bearing,
   the throttle shaft includes a second sliding portion that is integrally formed with the throttle shaft on the axially second end side axially outwardly with respect to the valve holding portion, and
   the second sliding portion slides inside of the second sliding hole of the second bearing in the rotation direction of the throttle shaft so that the second sliding portion is rotatably supported by the second bearing supporting portion via the second bearing.

2. A throttle apparatus according to claim 1,
   wherein the first thrust restricting means of the first bearing is constructed with a first supporting portion that is arranged on the axially first end side outwardly with respect to the valve holding portion of the throttle shaft,
   the second thrust restricting means of the second bearing is constructed with a second supporting portion that is arranged on the axially second end side outwardly with respect to the valve holding portion of the throttle shaft so that the first supporting portion and the second supporting portion axially oppose to each other,
   the throttle shaft has a first supported portion that is integrally formed with the throttle shaft on the axially first end side to be supported by the first supporting portion, and
   the throttle shaft has a second supported portion that is integrally formed with the throttle shaft on the axially second end side to be supported by the second supporting portion.

3. A throttle apparatus for an internal combustion engine, the throttle apparatus comprising:
   a throttle body that includes a cylindrical bore wall part defining an intake air passage, the bore wall part including,
      a first bearing supporting portion that is arranged on a first end side of the bore wall part in a radial direction of the bore wall part which is substantially perpendicular to a central axis of the cylindrical bore wall part, and
      a second bearing supporting portion that is arranged on a second end side of the bore wall part in the radial direction of the bore wall part,
   a first bearing that is supported by the first bearing supporting portion, the first bearing defining a first sliding hole;
   a second bearing that is supported by the second bearing supporting portion, the second bearing defining a second sliding hole;
   a throttle shaft that is supported by the first sliding hole of the first bearing on an axially first end side of the throttle shaft slidably in a rotating direction, and is supported by the second sliding hole of the second being on an axially second end side of the throttle shaft slidably in the rotating direction; and
   a throttle valve that is supported by the throttle shaft so that the throttle valve integrally rotates with the throttle shaft to control an amount of intake air flowing into the internal combustion engine,
   wherein the throttle, body is integrally molded of a resinous material,
   the first bearing has a first thrust restricting means that is integrally formed with the first bearing,
   the first thrust restricting means is formed of a same material as a material of the first bearing,
   the second bearing has a second thrust restricting means that is integrally formed with the second bearing, the first thrust restricting means is formed of a same material as a material of the second bearing, and the throttle shaft is at least partially inserted between the first thrust restricting means and the second thrust restricting means from both axially end sides of the throttle shaft to restrict the throttle shaft from moving axially with respect to the first bearing supporting portion and the second bearing supporting portion, wherein the first bearing has a first bearing restricting means that is integrally formed with the first bearing in an outer periphery of the first bearing to restrict the first bearing from moving in at least one of a rotating direction and an axial direction of the first bearing with respect to the first bearing supporting portion of the bore wall part, and the second bearing has a second bearing restricting means that is integrally formed with the second bearing in an outer periphery of the second bearing to restrict the second bearing from moving in at least one of a rotating direction and an axial direction of the second bearing with respect to the second bearing supporting portion of the bore wall part.

* * * * *